UNITED STATES PATENT OFFICE.

FRITZ ROESSLER, OF FRANKFORT-ON-THE-MAIN, GERMANY, ASSIGNOR TO THE ROESSLER & HASSLACHER CHEMICAL COMPANY, OF NEW YORK, N. Y., A FIRM.

METHOD OF MAKING SODIUM CYANID.

SPECIFICATION forming part of Letters Patent No. 711,910, dated October 21, 1902.

Original application filed February 4, 1899, Serial No. 704,564. Divided and this application filed March 11, 1902. Serial No. 97,789. (No specimens.)

*To all whom it may concern:*

Be it known that I, FRITZ ROESSLER, a subject of the Emperor of Germany, and a resident of Frankfort-on-the-Main, Germany, (whose postal address is No. 4 Schneidwallgasse,) have invented certain new and useful Improvements in the Manufacture of Sodium Cyanids, of which the following is a specification.

The majority of methods for obtaining cyanids synthetically yield in variable proportions a mixture of charcoal, alkali cyanid, and alkali carbonate, from which a marketable product is only derived by lixiviation, evaporation, and fusion. Numerous difficulties attend these operations. Lixiviating the mixture yields a lye which contains so much carbonate mixed with the cyanid that direct evaporation gives a product of low value. Moreover, it is known that cyanid solutions when evaporated without a vacuum undergo decomposition. Complete evaporation to dryness in a vacuum is, however, rendered almost impossible, because the salt which separates forms a sticky mass on the floor of the vessel, prohibiting agitation by means of stirrers. Furthermore, this deposit is a bad conductor of heat, and so retards evaporation. Siepermann's method (D. R. P. No. 51,562) takes advantage of the difference in solubility of potassium cyanid and potassium carbonate, the former being salted out from a warm concentrated solution by adding potassium carbonate. The method is not applicable to the sodium salts, as the solubility relationship is quite different. In synthesizing cyanids, however, the sodium salts offer a series of other advantages over the potassium compounds which makes it desirable to employ them.

The objects of the method of the present application, which is a division of my application, Serial No. 704,564, filed February 4, 1899, are to obtain from a mixture of sodium cyanid and carbonate of soda in any proportions a sodium-cyanid lye which is nearly free from sodium carbonate and to avoid complete evaporation and the loss of cyanid which this involves and prepare from this lye a pure anhydrous sodium cyanid which can be converted direct into the marketable form by fusion. The first part of the process depends on the fact not hitherto observed that contrary to the behavior of the potassium salts the sodium cyanid precipitates sodium carbonate from the lyes. While a solution containing three hundred and twenty grams of sodium cyanid (NaCy) per liter is capable of dissolving sixty-five grams of sodium carbonate, ($Na_2CO_3$,) a sodium-cyanid solution concentrated at 24° centigrade (containing four hundred and twenty-four grams of NaCy per liter) only dissolves forty-seven grams of $Na_2CO_3$, a solution concentrated at 33° centigrade (with five hundred and seventeen grams of NaCy per liter) dissolving only twenty-six grams of $Na_2CO_3$. The maximum solubility of sodium cyanid (five hundred and seventeen grams in one liter of solution) is attained at 33° centigrade. No further quantity of sodium cyanid dissolves on raising the temperature. If therefore a mass containing, for instance, sodium cyanid and carbonate of soda in about the proportion of six cyanid to one carbonate be lixiviated with enough water to dissolve all the salts, the solution will contain cyanid and carbonate in the proportion of six to one. According to the above said properties of sodium cyanid and carbonate of soda no cyanid but only carbonate will be precipitated if the solution be concentrated in a vacuum to a concentration corresponding to five hundred and seventeen grams of NaCy and twenty-six grams of $Na_2CO_3$ per liter. The lye which has been concentrated in this manner yields on cooling a copious deposit of crystals consisting of NaCy+2aq. These crystals can be freed from water of crystallization by exposure to a vacuum at ordinary temperatures over sulfuric acid or calcium chlorid.

The following is a more rational method, depending on the fact, hitherto unobserved, that if the crystals of NaCy+2aq are dissolved in their water of crystallization at 33° they do not yield clear liquid. Forty per cent. of the NaCy which they contain separates as anhydrous salt, which is not redissolved on raising the temperature. The anhydrous salt separates in a granular form and is quite easily freed from supernatant liquid by suction. The latter solution again contains five hundred and seventeen grams NaCy per liter and deposits crystals of NaCy+2aq on cooling. The mother-liquors obtained in the crystallization are used for dissolving fresh quantities of cyanid or concentrated in a vacuum until containing five hundred and seventeen grams of NaCy per liter.

I claim—

1. The method substantially as herein described of obtaining sodium cyanid which consists in treating a mixture of sodium cyanid and sodium carbonate with sufficient water to bring all the salts into solution, forming a lye, evaporating the lye in a vacuum to a degree of concentration at which only sodium carbonate is precipitated, and separating the precipitated sodium carbonate from the solution.

2. The method substantially as herein described of obtaining sodium cyanid, which consists in treating a mixture of sodium cyanid and sodium carbonate with sufficient water to bring all the salts into solution, forming a lye, evaporating the lye in a vacuum to a degree of concentration at which only sodium carbonate is precipitated, separating the precipitated sodium carbonate from the solution, and depositing crystals of sodium cyanid by cooling, as and for the purposes set forth.

3. The method substantially as herein described of obtaining sodium cyanid, which consists in treating a mixture of sodium cyanid and sodium carbonate with sufficient water to bring all the salts into solution, forming a lye, evaporating the lye in a vacuum to a degree of concentration at which only sodium carbonate is precipitated, separating the precipitated sodium carbonate from the solution, depositing crystals of sodium cyanid by cooling, and freeing the crystals from their water of crystallization, as and for the purposes set forth.

4. The method substantially as herein described of obtaining sodium cyanid, which consists in treating a mixture of sodium cyanid and sodium carbonate with sufficient water to bring all the salts into solution, forming a lye, evaporating the lye in a vacuum to a degree of concentration at which only sodium carbonate is precipitated, separating the precipitated sodium carbonate from the solution, depositing crystals of sodium cyanid by cooling, and fusing the crystals of sodium cyanid in their water of crystallization at about 33° centigrade, whereby the cyanid is separated in a state free from water, as and for the purposes set forth.

In testimony whereof I have signed my name to this specification in the presence of two subscribing witnesses.

FRITZ ROESSLER.

Witnesses:
JEAN GRUND,
CARL GRUND.